United States Patent [19]

Eastman et al.

[11] Patent Number: 4,650,028
[45] Date of Patent: Mar. 17, 1987

[54] VISCOUS COUPLING APPARATUS FOR ON-DEMAND FOUR WHEEL DRIVE SYSTEM

[75] Inventors: Richard E. Eastman, Central Square; Sanjeev K. Varma, Syracuse, both of N.Y.

[73] Assignee: Chrysler Motors Corporation, Highland Park, Mich.

[21] Appl. No.: 824,914

[22] Filed: Feb. 3, 1986

[51] Int. Cl.$^4$ .............................................. B60K 17/34
[52] U.S. Cl. ...................................... 80/233; 74/650; 180/248; 192/49
[58] Field of Search ....................... 180/233, 248, 197; 74/650, 666 F; 192/49, 58 B

[56] References Cited

U.S. PATENT DOCUMENTS

| | | | |
|---|---|---|---|
| 3,396,605 | 8/1968 | Wilkinson et al. | 74/650 |
| 4,449,604 | 5/1984 | Suzuki | 180/233 |
| 4,511,014 | 4/1985 | Makita | 180/233 |

*Primary Examiner*—John J. Love
*Assistant Examiner*—Donn McGiehan
*Attorney, Agent, or Firm*—Edward P. Barthel

[57] ABSTRACT

A viscous fluid rear axle coupling apparatus for a front engine vehicle having a front transaxle drivingly interconnected to its front pair of wheels. The viscous coupling apparatus includes power transfer means adapted to convert the rotation of the vehicle's longitudinal propeller shaft into rotation of an outer drum of the apparatus about a transverse axis. The outer drum concentrically surrounds a pair of coaxial right and left inner drums enclosed in a housing chamber filled with viscous fluid. Each inner drum is drivingly connected to respective right and left rear wheel output shafts extending transversely outboard therefrom. Each inner drum has a set of inner plates interleaved with a single set of outer plates of the outer drum. The apparatus functions as an interaxle and limited slip differential during four wheel drive as well as a conventional differential allowing the rear wheels to rotate different amounts during its two wheel and on-demand four wheel drive modes.

1 Claim, 2 Drawing Figures

VISCOUS COUPLING APPARATUS FOR ON-DEMAND FOUR WHEEL DRIVE SYSTEM

BACKGROUND OF THE INVENTION

This invention relates to an on-demand four wheel drive system and, more particularly, to a rear axle viscous coupling differential assembly for such a system.

Part-time on-demand four wheel drive systems employing viscous clutch drive-line arrangements are known in the prior art. One such arrangement, found on the front-wheel drive VW Golf vehicle, is called a Synchro 4-wheel drive system. This system is disclosed on page 5 of the Sept. 15, 1985 issue of the publication *Ward's Engine Update* as using two separate viscous couplings. One viscous coupling is connected in the longitudinal propeller shaft for dividing the torque between the front and rear wheels if the front wheels are in a slip condition. A second viscous coupling is associated with a conventional bevel gear rear axle differential to provide limited slip between the vehicle rear wheels.

SUMMARY OF THE PRESENT INVENTION

Accordingly, it is an object of the present invention to provide a part-time on-demand four wheel drive system wherein a single viscous coupling apparatus is incorporated in the vehicle rear axle serving as both an interaxle differential dividing the engine torque between the front and rear axles and a limited slip rear differential. Thus, the viscous coupling apparatus of the present invention eliminates the need for both two separate viscous couplings together with a conventional bevel gear rear differential as required, for example, in the above mentioned VW Synchro system.

A longitudinal propeller shaft of a front engine front drive vehicle is drivingly connected to a conventional bevel gear differential of a front wheel drive transaxle. The propeller shaft aft end has a drive bevel gear held in mesh with a driven beveled ring or crown gear having an axis of rotation at right angles to the axis of rotation of the drive bevel gear. This right-angle power transfer arrangement is adapted to convert the rotation of the propeller shaft into rotation of an outer viscous coupling drum, the principal axis of which is perpendicular to the propeller shaft and coincident with the transverse axis of the rear axle.

The viscous coupling outer drum concentrically surrounds a pair of right and left inner drums each relatively rotatable with respect to the outer drum about the rear axle transverse axis. Each inner drum rotates relative to the outer drum and has a plurality of plates attached thereto alternately interleaved with a plurality of plates attached to the outer drum. The outer drum has end cover plates defining a sealed chamber in which the interleaved plates are immersed in silicone fluid. A pair of right and left output shafts, aligned on the rear axle transverse axis, have their inboard ends splined into coaxial central bores of the right and left inner drums, respectively. The outboard end of the right and left output shafts are suitably attached to their respective right and left rear wheels. If either inner drum rotates relative to the outer drum, a speed differential occurs between adjacent right or left inner drum plates and the outer drum plates. This causes the temperature of the viscous fluid medium to increase as the fluid shears. There is a sharp increase in viscosity as the fluid quickly heats up, expands and builds up pressure inside the drum chamber. The torque transmitting and transferring operation between either the right or left output shaft and the outer drum becomes greater as the temperature rises and the fluid expands. Thus, if a momentary spin condition occurs at the front drive wheels engine torque is automatically divided between the front and rear axles providing a part-time on-demand four-wheel drive system. Further, the viscous coupling apparatus of the present invention provides automatic adjustment of traction at each rear wheel according to operating conditions thus serving as a limited slip differential between the rear wheels.

BRIEF DESCRIPTION OF THE DRAWINGS

The objects, features and advantages of the present invention are readily apparent from the following detailed description of the best mode taken in conjunction with the accompanying drawings in which.

DETAILED DESCRIPTION OF THE INVENTION

Figures 1, 2:
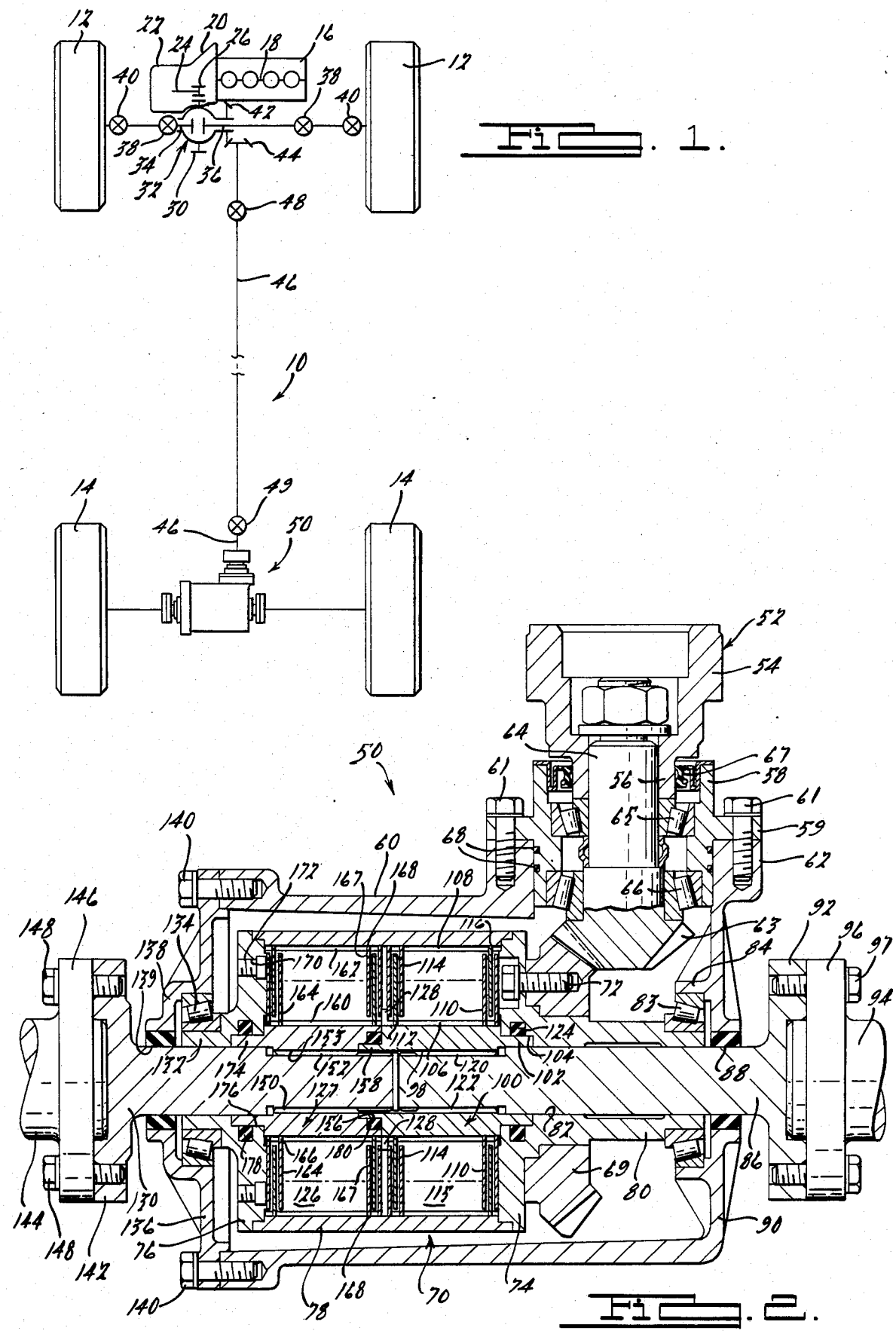
FIG. 1 is a schematic plan view of an on-demand four wheel drive system for a front wheel drive vehicle incorporating the rear axle viscous coupling apparatus of the present invention.
FIG. 2 is a fragmentary, horizontal sectional view of the rear axle viscous coupling apparatus according to the present invention.

FIG. 1 of the drawings diagrammatically discloses a motor vehicle drive train 10 with a transversely mounted front engine situated for use with the present invention. The vehicle has a pair of front drive wheels 12 and a pair of rear part-time drive wheels 14 with the front engine 16 positioned crosswise between the two front wheels.

As seen in FIG. 1 the engine has a transversely extending crankshaft 18 with its left end splined to clutch means (not shown) in shell 20. The clutch means is selectively connectable to an input shaft (not shown) of a transversely aligned manual or automatic transaxle power transmission unit 22. The transmission unit includes a change speed gear box with an output transfer shaft 24. In the preferred embodiment the transaxle transmission unit 22 may be as shown and described in FIG. 4–25 on page 73 of "Automotive Drive Trains" by F. Thiessan and D. Dales, published in 1984 by Reston Publishing, Inc., the disclosure of which is incorporated by reference herein.

The output shaft 24 has an output pinion gear 26 in meshed relation with an input ring gear 30 of a front-wheel to front wheel conventional bevel gear differential generally indicated at 32. The differential 32 has its side gear left and right output shafts 34 and 36, respectively, connected at their outer ends to the front road wheels 12 through suitable coupling means such as constant-velocity universal joints 38 and homokinetic tripod joints 40 shown, for example, in U.S. Pat. No. 4,372,418 to Dangle issued Feb. 8, 1983.

The differential 32 has an output crown gear 42 meshed with a cone gear 44 on the front end of a longitudinal front-to-rear propeller drive shaft 46. The propeller drive shaft 46 is connected through universal joint means 48 and 49 to a rear axle viscous coupling differential assembly generally indicated at 50.

As seen in FIG. 2 the differential assembly 50 has a cylindrical coupling 52 formed with an enlarged forward portion 54 adapted for suitable connection with the rearward end of the propeller drive shaft 46. The coupling 52 has a reduced aft portion 56 adapted for axial reception in a hub member 58. The hub member 58 has a radial flange 59 secured to viscous differential apparatus housing 60 by machine bolts 61 threadably received in housing collar 62. A driving bevel gear 63 has a longitudinal stem portion 64 journaled in two axially spaced bearings 65 and 66 mounted on the hub member 58. An annular lip seal 67 seals the coupling 52 within the hub member 58 while O-ring seals 68 seal the hub member 58 within the housing collar 62.

The driving bevel gear 63 is held in mesh with a driven beveled ring or crown gear 69 having a transverse axis of rotation at right angles to the longitudinal axis of rotation of the gear 63. The right-angle power transfer arrangement is adapted to convert the rotation of the longitudinal propeller drive shaft 46 into rotation about a transverse axis perpendicular to the propeller shaft. The crown gear 69 is fixedly secured to a viscous coupling casing assembly, generally indicated at 70, by machine bolts 72.

The casing assembly 70 includes annular right and left end cover plates 74 and 76, respectively, closing the ends of cylindrical outer drum 78. The right end plate 74 includes an axially extending hub portion 80 forming a transverse axial bore 82. The hub portion 80 has its free end journally supported by bearing assembly 83 in housing cup shaped member 84. The hub portion 80 supports a right rear differential output shaft 86 such that its outboard end projects through a journaled opening 88 in end wall 90 of housing 60. The right output shaft 86 has an outboard mounting disc 92 integrally formed thereon. The mounting disc 92 is coaxially coupled to right rear axle drive shaft 94 by means of its inboard disc 96 being removably secured thereto with machine bolts 97.

The inboard end of right output shaft 86 is splined within axial bore 98 of an inner right cylindrical drum 100. The right drum 100 has a reduced diameter annular outboard pilot extension 102 rotatably supported in a counterbored or stepped notch 104 formed in the inner surface of right end plate 74. The right drum 100 has external splines 106 axially aligned with internal splines 108 formed on the inner surface of the outer concentrically disposed drum 78.

The inner right drum splines 106 mount a plurality of first viscous coupling inner plates 110. The inner plates 110 are flat annular ring-shaped members having splines 112 at their inner periphery which drivingly engage the inner right drum external splines 106. The outer drum internal splines 108 mount a plurality of second viscous coupling outer plates 114. The plates 114 are flat annular rings having splines 116 at their outer periphery which drivingly engage the outer drum internal splines 108. The selected number of right inner set of drum plates 110 are alternately interleaved with the outer drum right side set of plates 114 and float between the latter in a right half portion 115 of a viscous fluid chamber. The plates 110 and 114, shown herein in their preferred embodiment, are similar to the plates shown in U.S. Pat. Nos. 3,760,922 and 4,031,780, the disclosures of which are incorporated by reference herein. It will be understood, however, that plates with other configurations may be used.

The right inner drum 100 axial bore 98 has internal splines 120 meshing with external splines 122 on right shaft 86. Thus, the right inner drum 100 and its associated plates 110 rotate solely in response to the rotation of right shaft 86. An annular oil seal 124 is provided between pilot extension 102 and the notch 104 of the right end plate 74 to prevent viscous fluid in a sealed annular chamber, defining right 115 and left 126 half chamber portions from leaking past the right output shaft 86. The chamber right 115 and left 126 half portions are thus defined by inner right and left drums 100 and 127, respectively, the outer drum 78 and the end plates 74 and 76. It will be noted that an annular external radial lip portion 128 is formed on the right drum 100 outboard end providing a separating guide lip or spacer portion between the opposed adjacent outer plates 114 and 167 of the outer drum. The outer set of plates 167, equal in number to the complementary outer set of plates 114, will be further described later in the specification.

A left output shaft 130 is axially supported in hub portion 132 of the left end plate 76. The hub portion 132 is journally supported by bearing assembly 134 in housing left end wall 136 integral cup shaped portion 138. The shaft 130 outboard end projects through a journaled opening 139 in cup-shaped portion 138. The left end wall 136 is removably affixed to the housing 60 by machine bolts 140. The left output shaft 130 has a mounting disc 142 integrally formed thereon. The mounting disc 142 is coaxially coupled to left rear axle shaft 144 by means of its inboard disc 146 being removably attached thereto by machine bolts 148.

The inboard end of left output shaft 130 has external splines 150 splined to internal splines 152 of axial bore 153 the left inner drum 127. Thus, inner drum 127 rotates in response to the rotation of left output shaft 130. The left inner drum 127 has a notched-out portion 156 adapted for axial relative rotational mating alignment with pilot extension 158 of the right inner drum 100.

In a symmetrical mirror image manner with right inner drum 100, the left inner 127 drum has external splines 160 aligned with internal splines 162 formed on the inner surface of the outer drum 78. The left inner drum external splines 160 mount a plurality of first viscous coupling inner plates 164 having splines 166 at their inner periphery which drivingly engage the left inner drum external splines 160. The outer drum internal splines 162 mount a plurality of second viscous coupling outer plates 167. The outer plates 167 have splines 168 at their outer periphery which drivingly engage the outer drum internal splines 162. The left inner drum plates 164 are alternately interleaved with the outer drum left side plates 167 in the left half portion 126 of the chamber.

The viscous coupling left end plate 76 has an opening 170 closed by a threaded plug 172. The opening 170 is provided for filling both viscous clutch right 115 and left 126 half portions of the chamber 126 with a predetermined quantity of viscous fluid (not illustrated). The viscous fluid in the preferred embodiment is a silicone fluid generally of the type described in U.S. Pat. No. 3,760,922, for example, the disclosure of which is incorporated by reference herein. It will be appreciated that the silicone fluid may have viscosity value ranges above or below that set forth in the '922 patent depending upon the coupling particular design characteristics. Further, other types of viscous fluids could be used without departing from the present invention. Similarly, while the sets of plates 110, 114, 164 and 166 shown herein are of the type of plates shown in U.S. Pat. No. 3,760,922, it will be understood that plates with other configurations may be used.

It will be noted that the left inner drum 127 has a reduced diameter annular outboard pilot extension 174 rotatably supported in a counterbored or stepped notch 176 formed in the inner surface of left end plate 76. Further, an annular oil seal 178 is provided between the pilot extension 174 and the notch 176 to prevent leakage of fluid from the chamber past left output shaft 130. An intermediate annular oil seal 180 is also provided at the piloted 156, 158 juncture of the inner right and left drums to seal the viscous fluid chamber portions 115 and 126.

Thus, it will be appreciated that the viscous fluid rear axle coupling apparatus of the present invention provides a single unit that serves as a conventional differential, allowing the two rear wheels to rotate different amounts when the car goes around a turn, as well as an inter-axle differential. That is, upon traction losses at the front wheels developing, the propellar shaft 46 rotational speed increases resulting in the outer sets of plates 114 and 167 imparting an increased shearing action to the silicone fluid in the chambers 115 and 126. The highly viscous fluid becomes progressively resistant to flow thereby developing a relatively high torque transmission to the rear wheels. This provides an effective coupling of the front and rear wheels inhibiting wheel spinning or locking by virtue of a torque feedback to the front wheels.

Further, the viscous coupling differential assembly 50 limits slip of the rear wheels while delivering torque to the rear wheels when the front wheels slip. This results from the rotational speed difference between the inner sets of plates 110 and 164 and their associated outer plates 114 and 167 respectively, caused by one of the rear wheels developing a spin condition. It is an advantage, therefore, to have a single easily packaged viscous coupling differential unit providing combined part time on-demand four wheel drive and rear axle biasing.

Although only one embodiment of the invention has been disclosed and described, it is apparent that other embodiments and modifications of the invention are possible.

What is claimed is:

1. A viscous fluid rear axle coupling apparatus for a front engine drive vehicle having front and rear pairs of road wheels, said vehicle having a front transaxle including differential means drivingly interconnected to said front pair of wheels, a longitudinally extending propeller shaft having its forward end drivingly connected to said transaxle differential means, said propeller shaft having right-angle power transfer means adjacent to its aft end adapted to receive engine torque from said front differential, said right angle power transfer means comprising in part a crown gear fixedly secured to a viscous coupling apparatus, the improvement wherein said apparatus comprising a viscous coupling casing having a pair of right and left outboard end cover plates closing the ends of a cylindrical outer drum defining a sealed viscous fluid chamber, one of said cover plates removably fastened to said crown gear, said power transfer means adapted to convert the rotation of said propeller shaft into rotation of said outer drum about a transverse axis coincident with rear axle means, said outer drum concentrically surrounding a pair of coaxial right and left inner drums, said right and left inner drums each fixedly connected to respective coaxial right and left transverse output shafts such that said inner drums rotate relative to each other and to said outer drum, means connecting said right and left output shafts to an associated one of said pair of rear wheels, respectively, said outer drum having a transverse axial dimension at least twice the combined transverse axial dimension of both said right and left inner drums, said right and left inner drums having juxtaposed inboard end faces each formed with a complementary stepped notch-out portion and an interengaging pilot extension portion providing a lapped juncture therebetween for axial relative rotational mating alignment of said drums in a concentric relatively rotatable manner on their associated right and left output shafts, each said left and right inner drum having a reduced diameter annular outboard pilot extension rotatably supported in a stepped notch formed in the inner surface of its associated end cover plate, an annular oil seal located radially intermediate each said stepped notch-out and pilot extension portion sealingly enclosing said viscous fluid chamber. Each said inner drum having a plurality of plates attached thereto alternately interleaved with a plurality of plates attached to said outer drum, said right and left inner drum plates and said outer drum plates immersed in the viscous fluid of said chamber, whereby if either said right or left inner drum rotates relative to said outer drum, a speed differential occurs between adjacent right or left inner drum plates and said outer drum plates, causing the viscous fluid to be sheared, such that upon said front wheels undergoing momentary slippage engine torque is automatically divided between said front transaxle and said rear axle means providing an on-demand four-wheel drive mode for said vehicle, and whereby said viscous coupling apparatus providing limited slip differentiation between said rear pair of wheels.

* * * * *